United States Patent
Yigzaw et al.

(10) Patent No.: US 8,275,942 B2
(45) Date of Patent: Sep. 25, 2012

(54) PERFORMANCE PRIORITIZATION IN MULTI-THREADED PROCESSORS

(75) Inventors: Theodros Yigzaw, Sherwood, OR (US); Geeyarpuram N. Santhanakrishnan, Hillsboro, OR (US); Mark Rowland, Beaverton, OR (US); Ganapati Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 11/316,560

(22) Filed: Dec. 22, 2005

(65) Prior Publication Data

US 2007/0150657 A1   Jun. 28, 2007

(51) Int. Cl.
*G06F 12/00* (2006.01)
*G06F 13/00* (2006.01)

(52) U.S. Cl. ............ 711/128; 711/3; 711/118; 711/130; 711/131; 711/149; 711/154

(58) Field of Classification Search .............. 711/131, 711/118, 128, 149, 154, 130, 3
See application file for complete search history.

(56) References Cited

U.S. PATENT DOCUMENTS

| | | | |
|---|---|---|---|
| 5,787,490 A | | 7/1998 | Ozawa |
| 6,604,174 B1 | | 8/2003 | Dean et al. |
| 7,401,208 B2 * | | 7/2008 | Kalla et al. ............ 712/224 |
| 2008/0195048 A1 * | | 8/2008 | Niehoff ............ 604/154 |
| 2008/0216076 A1 * | | 9/2008 | Udell et al. ............ 718/100 |

FOREIGN PATENT DOCUMENTS

| | | |
|---|---|---|
| JP | 9-101916 | 4/1997 |
| JP | 2002-342163 | 11/2002 |
| JP | 2005-71046 | 3/2005 |
| JP | 2005-196303 | 7/2005 |
| JP | 2005-316842 | 11/2005 |
| WO | WO 00/68778 | 11/2000 |

OTHER PUBLICATIONS

"International Search Report and Written Opinion for PCT/US2006/046892", (Dec. 7, 2006), Whole Document.
"Office Action issued in German Patent Application No. 11 2006 003 081.7-53", Mailed Sep. 5, 2008. Mailing date from the foreign associate, Oct. 14, 2008. 4 pgs.
Office Action from foreign counterpart German Patent Application No. 11 2006 003.0871.7-53, mailed Mar. 11, 2010, 7 pages (Translation included).

(Continued)

*Primary Examiner* — Midys Rojas
(74) *Attorney, Agent, or Firm* — Blakely, Sokoloff, Taylor & Zafman LLP (57) ABSTRACT

According to one embodiment of the invention, a method is disclosed for selecting a first subset of a plurality of cache ways in a cache for storing hardware threads identified as high priority hardware threads for processing by a multi-threaded processor in communication with the cache; assigning high priority hardware threads to the selected first subset; monitoring a cache usage of a high priority hardware thread assigned to the selected first subset of plurality of cache ways; and reassigning the assigned high priority hardware thread to any cache way of the plurality of cache ways if the cache usage of the high priority hardware thread exceeds a predetermined inactive cache usage threshold value based on the monitoring.

32 Claims, 5 Drawing Sheets

OTHER PUBLICATIONS

Office Action from foreign counterpart China Patent Application No. 2006800437619, mailed Oct. 23, 2009, 16 pages (Translation included).

Office Action from foreign counterpart Korea Patent Application No. 10-2008-7015056, mailed Jun. 22, 2009, 10 pages (Translation included).

Office Action from foreign counterpart Korea Patent Application No. 10-2008-7015056, mailed Dec. 24, 2009, 8 pages (Translation included).

KIPO'S Notice of Last Preliminary Rejection Office Action from foreign counterpart Korea Patent Application No. 10-2008-7015056, mailed Jan. 22, 2010, 3 pages (Translation only).

Examination Report under Section 18(3) from foreign counterpart Great Britain Patent Application No. GB0809458.3, mailed Jun. 23, 2010, 2 pages.

Office Action from foreign counterpart China Patent Application No. 2006800437619, mailed Dec. 28, 2010, 13 pages (Translation included).

Office Action from foreign counterpart Japan Patent Application No. 2008-544535, Mar. 15, 2011, 9 pages.

Office Action from foreign counterpart Great Britian Patent Application No. GB0809458.3, Oct. 25, 2010, 2 pages.

Office Action from foreign counterpart Great Britian Patent Application No. GB0809458.3, Nov. 29, 2010, 2 pages.

Office Action from foreign counterpart German Patent Application No. 11 2006 003 081.7 mailed Nov. 7, 2011, 6 pages.

Second Office Action from foreign counterpart China Patent Application No. 200680053761.9 mailed Nov. 22, 2010, 13 pages.

Second Third Office Action from foreign counterpart China Patent Application No. 200680053761.9 mailed Jun. 23, 2011, 6 pages.

* cited by examiner

PERFORMANCE PRIORITIZATION IN MULTI-THREADED PROCESSORS

FIELD

Embodiments of the invention relates to a multi-threaded processor, and more particularly to the processing of threads in multi-threaded processors.

BACKGROUND

An application program can be broken into threads, which are sequences of instructions, such as executable units, that are executed on the Central Processing Unit (CPU) of a computer. Generally, a program is first divided into software threads by the operating system, then each software thread is mapped or scheduled onto a corresponding hardware thread in a CPU, which are typically sets of registers in a CPU. To process the threads at a faster rate, multi-threaded processors can be used which can concurrently receive and process multiple threads at a given time.

During software thread creation, some threads may be deemed to have a higher priority associated with them than others. The operating system thus prioritizes software threads based on desired performance characterizations. One method of thread prioritization by the operating system is the time-slice method used today by multi-processing systems. In this method, a software thread with higher priority receives more frequent time slices than one with a lower priority, and is more tended to by the multi-processing system, thus often achieving better performance.

While in use with multi-processing systems, the foregoing prioritizing method is ineffective in multi-threaded environments, where resources are equally contended among concurrently executing threads. The problem arises when the prioritized software threads are mapped into hardware threads for processing by a multi-threaded processor. Currently, multi-threaded processors treat each hardware thread equally despite their assigned software level priority, thus reducing the effectiveness of the initial operating system prioritization of the threads.

One reason for such shortcoming in the prior art lies with the cache system of the multi-threaded processor. Traditionally, cache replacement algorithms used for operating the cache system have been designed to provide symmetric treatment to all threads. In symmetric multi-processing systems, however, concurrent execution of various tasks of hardware threads (i.e. without prioritization) usually compromises performance, especially of real-time threads which are often given high priorities by the software. This can be an impediment in workstation and home offices when many routine maintenance tasks, such as disk fragmentation and virus scan run concurrently with real time tasks such as multi-media decoding.

DETAILED DESCRIPTION OF THE INVENTION

Embodiments of the invention generally relate to a system and method for performance prioritization in multi-threaded processors. Herein, embodiments of the invention may be applicable to multi-threaded processors used in a variety of computing devices, which are generally considered stationary or portable electronic devices. Examples of computing devices include, but not limited or restricted to the following: computers, workstations. For instance, the computing device may be generally considered any type of stationary or portable electronic device such as a set-top box, wireless telephone, digital video recorder (DVRs), networking equipment (e.g., routers, servers, etc.) and the like.

Certain details are set forth below in order to provide a thorough understanding of various embodiments of the invention, albeit embodiments of the invention may be practiced through many embodiments other than those illustrated. Well-known logic and operations are not set forth in detail in order to avoid unnecessarily obscuring this description.

In the following description, certain terminology is used to describe features of the various embodiments of the invention. For example, the term "multi-threaded processor" includes any device to concurrently process two or more data threads. The term "software thread" refers to sequences of instructions, such as executable units, resulting from the breaking down of a software program into such instruction sequences, and which can then be executed on a processor, such as a Central Processing Unit (CPU), of a computing device. The term "hardware thread" refers to a sets of registers or other storage medium in a processor to which the software threads are mapped or scheduled.

The term "software" generally denotes executable code such as an operating system, an application, an applet, a routine or even one or more instructions. The software may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

Figure 1:
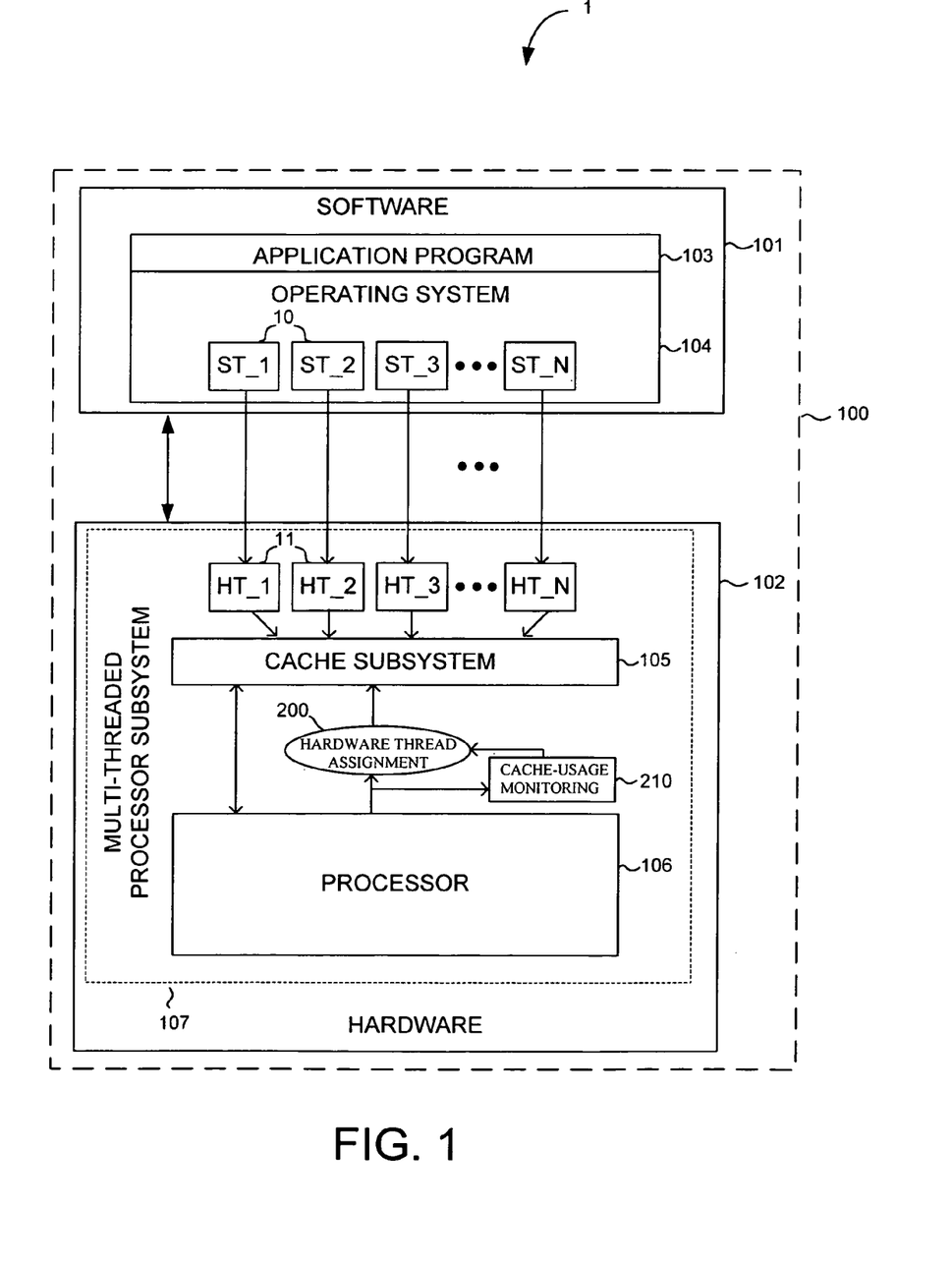
FIG. 1 illustrates a multi-threaded processor environment in which exemplary embodiments of the invention may be practiced.

With reference to FIG. 1, a multi-threaded processor environment 1 is illustrated, such as that of a computer or workstation, in which exemplary embodiments of the invention may be practiced. As shown in FIG. 1, the multi-threaded processor environment 1 comprises software 101 and associated hardware 102. The software 101 comprises one or more application programs 103 and an operating system 104. The hardware 102 comprises a multi-threaded processor subsystem 107 having a cache subsystem 105 in communication with a processor 106, such as processor core. As described above, during an execution of the application program 103, the operating system divides the tasks to be performed by the application program 103 into software threads 10, such as ST_1 through ST_N (N>1), which are sequences of instructions, such as executable units. As shown in FIG. 1, each software thread 10 is then mapped or scheduled onto a corresponding hardware thread 11, such as HT_1 through HT_N (N>1), which are typically sets of registers, and then processed, such as concurrently, by the processor 106. As shown in FIG. 1, the interaction between processor 106 and cache subsystem 105 in regards to the processing of the hardware threads 11 is controlled by the hardware thread assignment subsystem 200 and cache-usage monitoring subsystem 210 as described below and in greater detail in conjunction with FIGS. 2A-B.

Figure 2A:
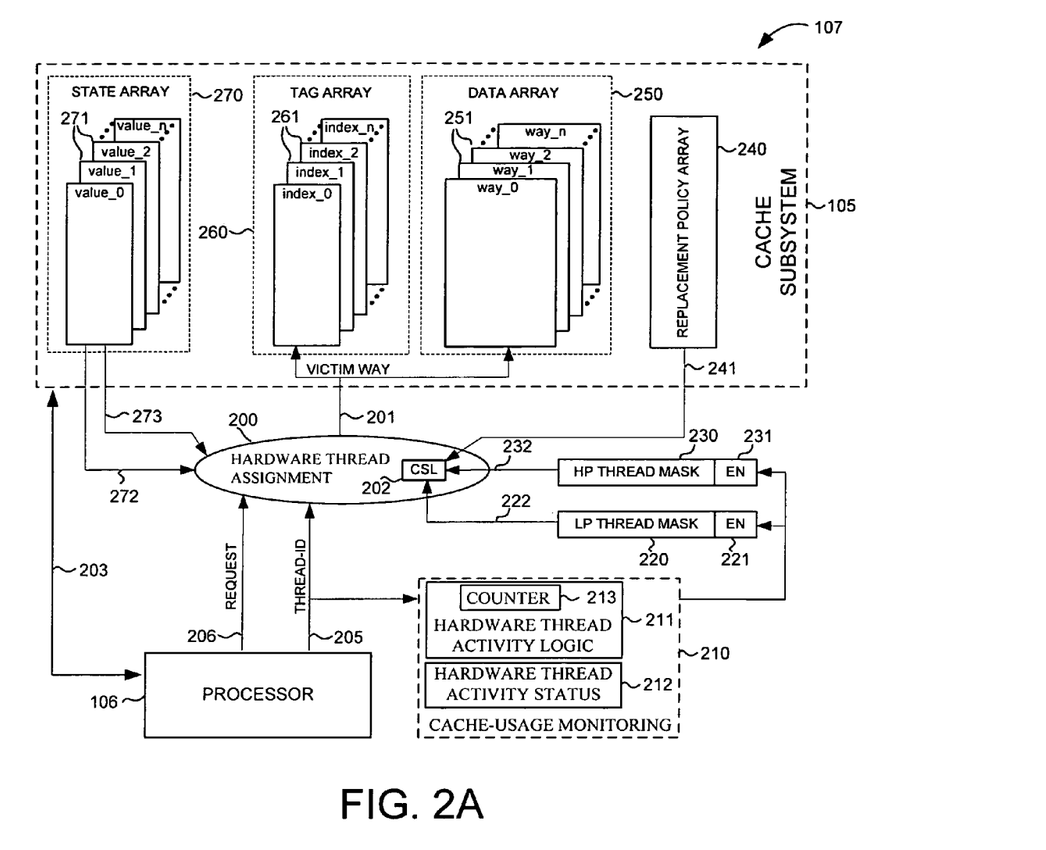
FIGS. 2A-B illustrate exemplary embodiments of the invention.
Figure 2B:
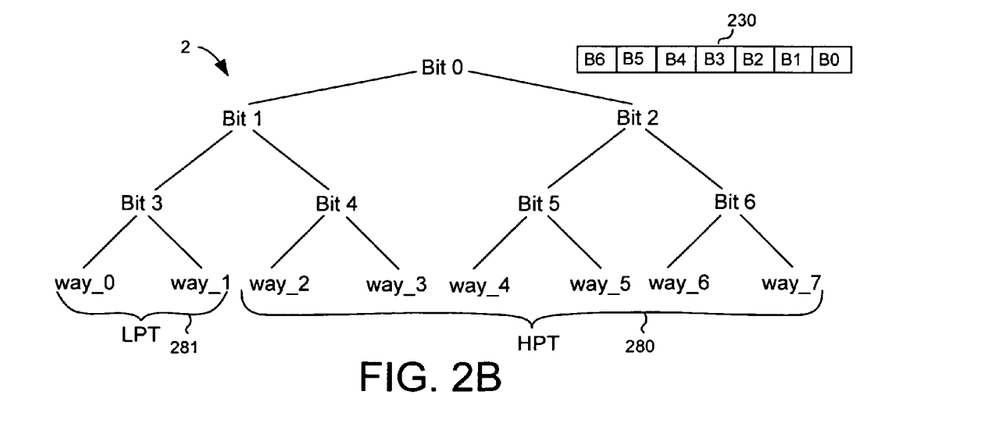

FIGS. 2A-B illustrate exemplary embodiments of the invention. For simplicity of illustration, the processor 106 is a dual-thread processor, although other processors capable of processing any number of threads are also contemplated to be within the scope of the exemplary embodiments of the invention. As shown in FIG. 2A, the cache subsystem 105 is in communication with the processor 106, such as via signal 203 for reading and writing of data from and to the cache subsystem 105, and via signals 205, 206 and 201 for processing of the hardware threads 11. The cache subsystem 105 further comprises a data array 250 including a plurality of cache ways 251, such as way_0 through way_n (n>1), for storing data from hardware threads 11. The multi-threaded processor subsystem 107 further comprises a hardware thread assignment subsystem 200 which uses cache way selection logic subsystem (CSL) 202 to select a subset of cache ways 251 to store data from hardware threads 11 identified as high priority hardware threads 11 for processing by the processor 106, as described in greater detail in conjunction with FIG. 5. Based on the selection of cache way selection logic subsystem 202, the hardware thread assignment subsystem 200 is to assign high priority hardware threads 11 to the subset of the cache ways 251 selected for storing high priority hardware threads 11.

Figure 3:
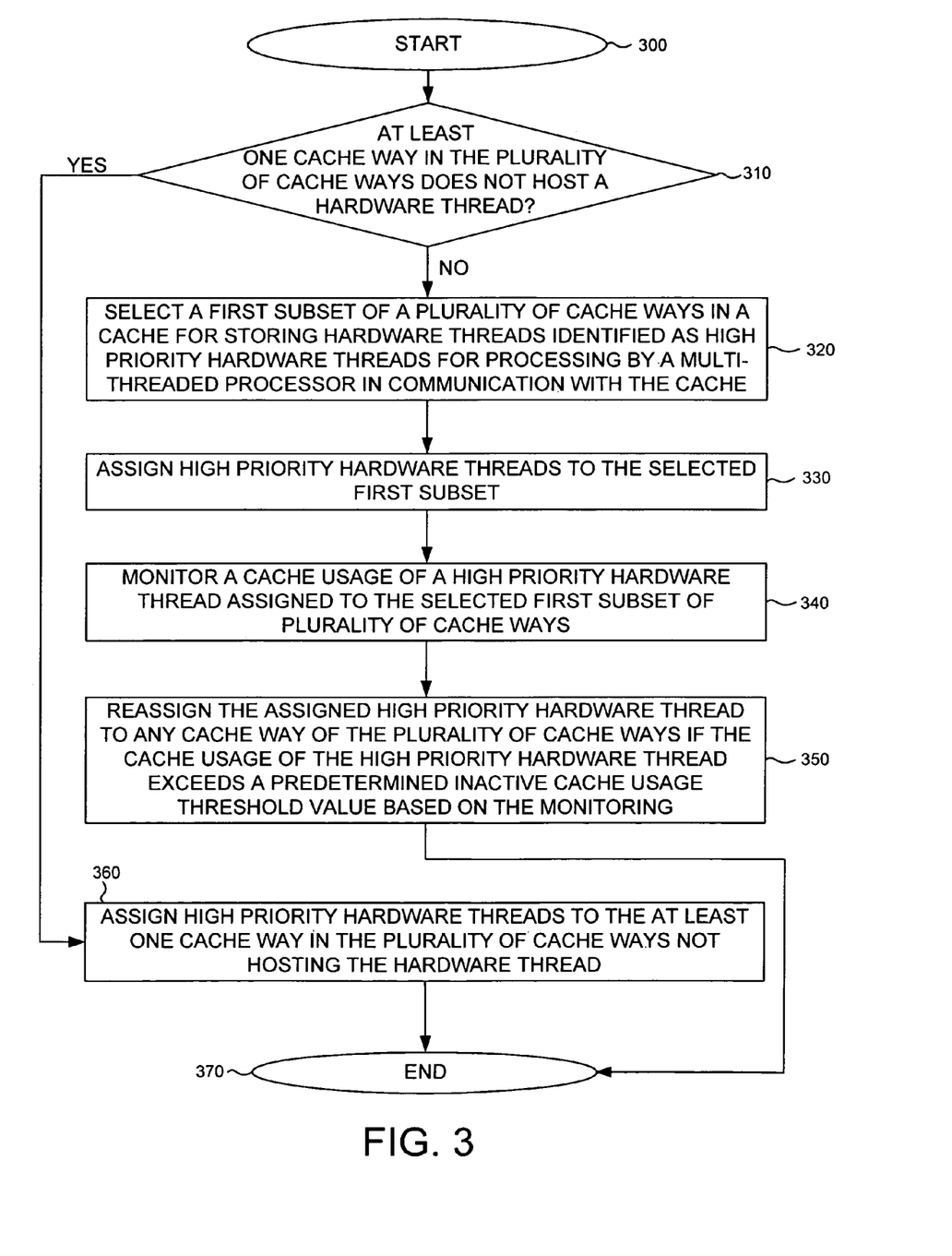
FIG. 3 is a flow chart illustrating a process according to an exemplary embodiment of the invention.
Figure 4:
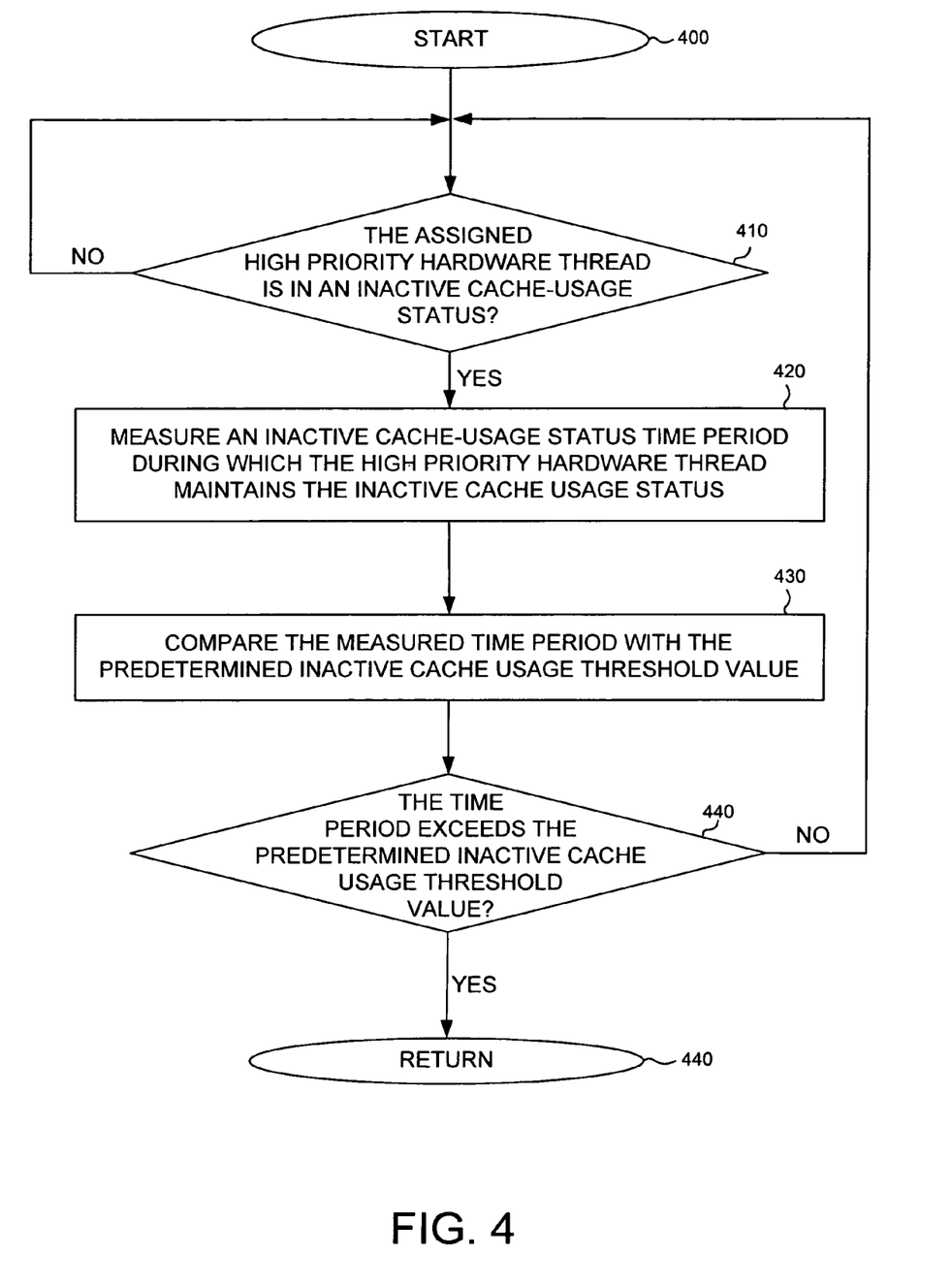
FIG. 4 is a flow chart further illustrating the exemplary process illustrated in FIG. 3.
Figure 5:
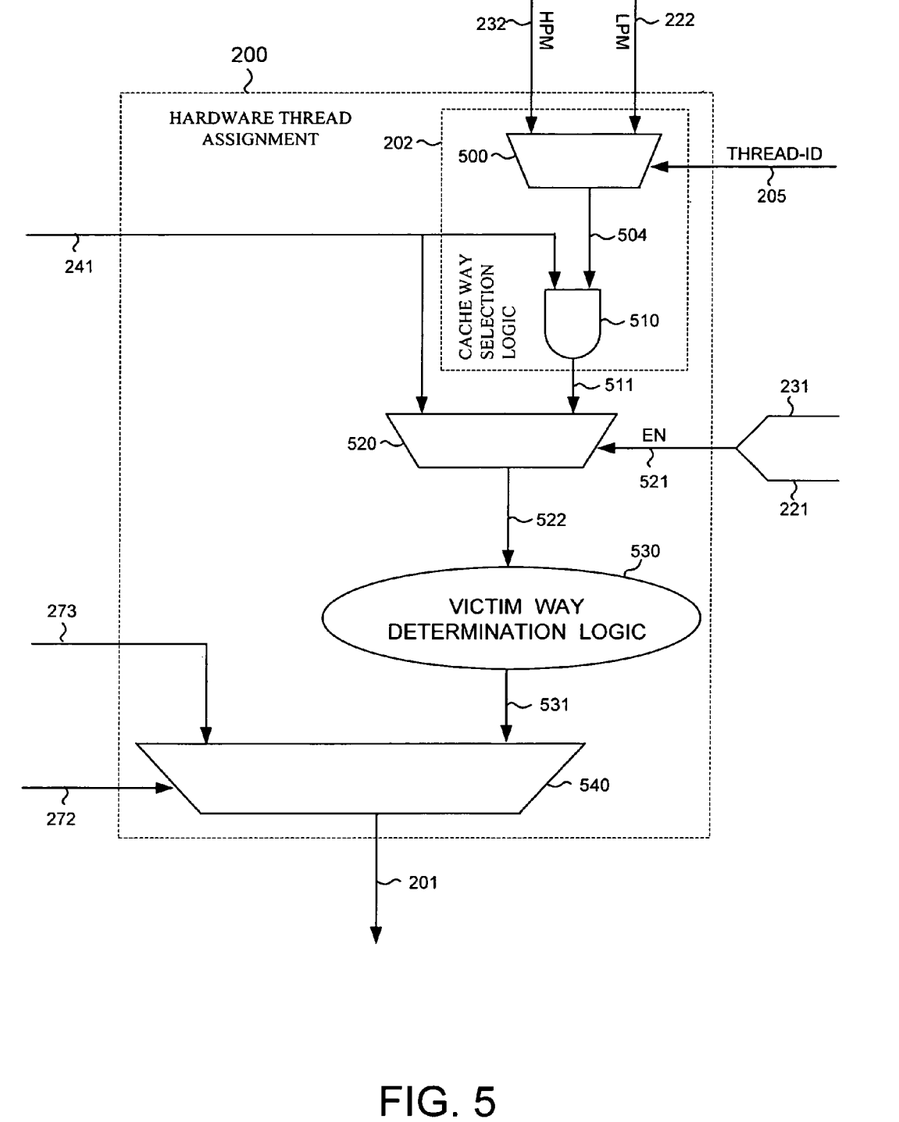
FIG. 5 is a circuit diagram of the exemplary embodiments of the invention show in FIGS. 2A-B.

As further shown in FIG. 2A, the multi-threaded processor subsystem 107 further comprises a cache-usage monitoring subsystem 210 in communication with the cache subsystem 105 and to monitor a high priority hardware thread 11, such as HT_1, assigned to subset of the cache ways 251 selected for storing data from high priority hardware threads 11, and to compare monitored cache usage of the high priority hardware thread HT_1 to a predetermined cache usage threshold value, as described in greater detail in conjunction with FIG. 3-5 below. The hardware thread assignment subsystem 200 can reassign the assigned high priority hardware thread HT_1 to one of the cache ways 251 if the cache usage of the high priority hardware thread HT_1 exceeds the predetermined cache usage inactivity threshold value. After this reassignment, the hardware thread assignment subsystem 200 ignores the selection of the subset of cache ways 251 to store data from high priority hardware threads 11, and may reassign the hardware thread HT_1 to any of the cache ways 251 in the data array 250. If hardware thread HT_1 were to resume active cache usage following the reassignment, then the reassignment would be suspended and the above thread based selection will be reactivated automatically.

FIG. 3 is a flow chart which in conjunction with FIG. 2A-B, illustrates a process according to an exemplary embodiment of the invention. As shown in FIG. 3, the process begins in block 300 and proceeds to decision block 310 in which it is determined if at least one cache way 251 does not host a hardware thread 11 (e.g., it has no relevant data stored therein). As shown in FIG. 2A, the cache subsystem 105 includes a state array 270 which maintains a set of values 271, such as value_0 to value_n (n>1) with each value 271 corresponding to a cache way 251 in the data array 250. Each value 271, such a value_0, indicates if a corresponding cache way 251, such as way_0, hosts a hardware thread 11. Suitably, a value 271 comprises a binary value with one value such as 1 indicating that a corresponding cache way 251 is "valid" (e.g., it hosts a hardware thread 11) and another value such as zero indicating that the cache way 251 is "invalid" (e.g., it does not hosts a hardware thread 11).

If in block 310 it is determined that all of the cache ways 251 hosts a hardware thread 11, then the flow proceeds to block 320 in which a subset of cache ways 251 is selected for storing hardware threads 11 identified (such as by the operating system 104) as high priority hardware threads 11 for processing by a the processor 106.

As shown in FIG. 2A, the cache subsystem 105 includes a replacement policy array (RPA) 240 which determines to which cache way 251 a given hardware thread 11 may be assigned. In an exemplary embodiment of the invention, a high priority thread mask 230 is used to alter the selections of the RPA 240 so that a subset of the cache ways 251 are set aside to be used for only high priority hardware threads 11. Suitably the number of cache ways 251 set aside to be used for only high priority hardware threads 11 is greater than half of the total number of cache ways 251 in state array 250. Suitably, the high priority thread mask 230 is a string of bits generating a signal 232 that when applied to the bits of the decision signal 241 of the RPA 240, results in the RPA 240 to point to only a subset of the cache ways 251. Suitably, the high priority thread mask 230 comprises one or more registers (not shown) for storing of the high priority masking bits.

FIG. 2B illustrates an example of this application of a high priority thread mask 230 to a decision signal 241 of the RPA 240. For simplicity of illustration, a pseudo-LRU algorithm (PLRU) is used by RPA 240 for an eight way cache (way_0 though way_7), and to which a 7-bit (B0 through B7) high priority thread mask 230 is applied. In this example, anytime that the high priority thread mask 230 is enabled and there is a request 206 (shown in FIG. 2A) to fill a cache way 250 by a high priority hardware thread 11, the bits of the high priority thread mask 230 are applied to the PLRU bits, such as shown symbolically by the decision tree 2. This applying of a predetermined high priority thread mask 230 (based on principles well known in the art) results in a biasing of bit1 of the PLRU (shown in tree 2) to 0 and which ultimately results in ways_2 through way_7 to be made available only to high priority hardware threads 11. Thus by predetermining the bits of the high priority thread mask 230 based on the PLRU bits to effectuate the above results, a subset 280 of cache ways comprising way_2 through way_7 is set aside to be used for only high priority hardware threads 11. The process of block 320 in FIG. 3 therefore effectuates a bias in the decisions of the RPA 240 in favor of the high priority threads 11 thereby increasing the availability of the resources of the cache subsystem 105 for the high priority hardware threads 11.

A low priority thread mask 220 can similarly be applied to low priority threads 11, as shown in FIGS. 2A-B, so that a subset of the cache ways 251 are set aside to be used for only low priority hardware threads 11. Suitably, the low priority thread mask 220 is a string of bits generating a signal 222 that when applied to the bits of the decision signal 241 of the RPA 240, result in the RPA 240 to point to only a subset of the cache ways 251. Suitably, the low priority thread mask 230 comprises one or more registers (not shown) for storing of the low priority masking bits. Applying a predetermined low priority thread mask 220 to the example of FIG. 2B in the manner described above results in way_0 and way_1 to be made available only to low priority hardware threads 11. In this way, a subset 281 of cache ways comprising way_0 and way_1 is set aside to be use for only low priority hardware threads 11. Suitably, both a low priority thread mask 220 and a high priority thread mask 230 are used so that the use of two selected subsets decrease the chances of low priority hardware threads 11 from equally sharing the cache subsystem 105 with high priority hardware threads 11, while at the same time ensuring that the low priority hardware threads 11 are not completely shut out due to an accidental selection of all of the cache ways 251 for high priority hardware threads 11. Suitably, at least one of the low priority thread mask 220 and high priority thread mask 230 are programmable, such as via instructions received from a human user. The programming of the low priority thread masks 220 and high priority thread mask 230 is dependent on the particular replacement algorithms used by the RPA 240.

In another exemplary embodiment, the low priority thread mask 220 and high priority thread mask 230 can be programmed so that their respective low priority and high priority subsets share at least one cache way 251 that can be used to store both low priority hardware threads 11 and high priority hardware threads 11. For instance, in the example of FIG. 2B, it is possible to program the low priority thread mask 220 and a high priority thread mask 230 in such a manner that way_0 and way_1 are shared by both low priority and high priority hardware threads 11, way_2 and way_3 are reserved for the low priority hardware threads 11 only, and way_4 through way_7 are reserved only for the high priority hardware threads 11. Suitably, the selecting of each of the low priority and high priority subsets of cache ways 251 is programmable and performed on a per-hardware thread 11 basis based on a received thread-ID 205. Suitably, a number of the cache ways 251 to be selected for each of the low priority and high priority subsets is also programmable.

Returning back to FIG. 3, the flow then proceeds to block 330 in which high priority hardware threads 11 are assigned to the subset of the cache ways 251 selected in block 320 to be used for only high priority hardware threads 11. Next, in block 340, a cache usage of a high priority hardware thread 11, such as HT_1, assigned to the subset of the cache ways 251 selected in block 320 is monitored, such as by a cache-usage monitoring subsystem 210 shown in FIG. 2A and described below and in greater detail in conjunction with FIG. 4.

FIG. 4 is an exemplary flow chart which in conjunction with FIG. 2A further illustrates the monitoring process illustrated in block 340 FIG. 3. As shown in FIG. 4, the process begins in block 400 and proceeds to the decision block 410 in which the cache-usage monitoring subsystem 210 determines if the assigned high priority hardware thread HT_1 is in an inactive cache-usage status. Suitably, the cache-usage monitoring subsystem 210 comprises a hardware thread activity status subsystem 212 shown in FIG. 2A monitors the activities of the high priority hardware threads 11 based on the thread-ID 205 received from the processor 106. If it is determined that the high priority hardware thread HT_1 is not in an inactive status (decision block 410), the flow is returned to the decision block 410 and continues to loop in the foregoing fashion until the high priority hardware thread HT_1 has been processed by the processor 106.

If in decision block 410 it is determined that the high priority hardware thread HT_1 is in an inactive status, the flow then proceeds to block 420 in which an inactive cache-usage status time period is measured, which is the time during which the high priority hardware thread HT_1 maintains the inactive cache usage status. The flow then proceeds to block 430 in which the measured time period is compared with a predetermined inactive cache usage threshold value. Next, in decision block 440, if it is determined that the measured time period does not exceed the predetermined inactive cache usage threshold value, the flow is returned to the decision block 410. If it is determined that the measured time period exceeds the predetermined cache usage threshold value (decision block 440), the process is returned to block 340 of FIG. 3. Suitably, measuring the inactive cache-usage status time period in block 420 is performed by the hardware thread activity logic subsystem 211 as shown in FIG. 2A based on cycles of a clock (not shown). The hardware thread activity logic subsystem 211 comprises a counter 213 to increment a count based on the measured cycles of the clock, the count corresponding to the time period during which a high priority hardware thread 11 such as HT_1 maintains the inactive cache usage status. Suitably, the measured time period comprises the count. The hardware thread activity logic subsystem 211 then compares the measured time period with the predetermined inactive cache usage threshold value, and determines if the measured time period exceeds the predetermined inactive cache usage threshold value. Suitably, the hardware thread activity logic subsystem 211 may be implemented in a variety of software or hardware implementations.

Returning to FIG. 3, the flow proceeds to block 350 in which the high priority hardware thread HT_1 is reassigned to another cache way 251 if based on the result of the decision block 440 of FIG. 4, it is determined that the cache usage of the high priority hardware thread HT_1 exceeded the predetermined inactive cache usage threshold value based on the monitoring (e.g., it is determined that the inactivity period of the HT_1 exceeded an acceptable period). The reassigning of the assigned high priority hardware thread HD_1 then includes disabling the low priority thread mask 220 and the high priority thread mask 230 such as via changing a value in their respective enable bits 221 and 231 as shown in FIG. 2A. The disabling allows the reassigning of the HT_1 to another cache way 251 without the restrictions of the subsets imposed by the application of the low and high priority thread masks 220 and 230. As shown in FIG. 2A, the cache way 251, such as way_0 hosting HT_1, is then selected by the hardware thread assignment subsystem 200 as the victim way and made available to another hardware thread 11. Suitably, the hardware thread assignment subsystem 200 transmits a victim way signal 201 to the data array 250 and the tag array 260 to make way_0 available to another hardware thread 11. Suitably, the tag array 260 maintains a set of indexes 261, such as index_0 to index_n (n>1) with each index 261 corresponding to a cache way 251 in the data array 250. HT_1 is then reassigned to a cache way 251 by the hardware thread assignment subsystem 200. The flow then proceeds to block 370 in which the overall process ends.

Returning to decision block 310, if it is determined that one or more cache ways 251 do not host a hardware thread 11, then the flow proceeds to block 360 in which the high priority hardware threads 11 are assigned to the cache ways 251 not hosting hardware threads 11. Suitably, in decision block 310, the state array 270 informs hardware thread assignment subsystem 200, such as via a signal 272 if one or more cache ways 251 do not host a hardware thread 11 so that the flow can proceed to block 360. Next, in block 360, the state array 270 provides the hardware thread assignment subsystem 200, such as via a signal 273, with information on the cache-ways 251 that do not host hardware threads 11, based on which the hardware thread assignment subsystem 200 assigns high priority hardware threads 11 to the cache ways 251 not hosting the hardware threads 11. The flow then proceeds to block 370 in which the overall process ends. It should be noted that the operations in blocks 310 and 360 can be performed either subsequent or prior to those in blocks 320 through 350 depending on the desired software or hardware implementation considerations. Suitably, the multi-threaded processor environment 1 includes a storage medium (not shown) that provides software that, if executed by the multiprocessor subsystem 107, will cause the multiprocessor subsystem 107 to perform the above described operations of FIG. 3 and FIG.

4. Suitably, the storage medium is implemented within the multiprocessor subsystem 107.

FIG. 5 is a circuit diagram of the hardware thread assignment subsystem 200 shown in FIG. 2. The overall operations of the circuitry of the hardware thread assignment subsystem 200 will now be discussed in reference to the above-described operations of FIG. 3 and FIG. 4. As described above in conjunction with FIG. 2A and block 320 of FIG. 3, the multi-threaded processor subsystem 107 comprises a cache way selection logic subsystem 202 to select a subset of cache ways 251 to store hardware threads 11 identified as high priority hardware threads 10 for processing by the processor 106. As shown in FIG. 5, the cache way selection logic subsystem 202 can receive as input the string of bits of the high priority thread (HPM) mask 230 generating a signal 232, and the string of bits of the low priority thread (LPM) mask 220 generating a signal 222. Signals 222 and 232 are then received in the multiplexer 500 which selects a high priority thread or low priority thread masks 230 or 220. Suitably the selection by the multiplexer 500 is based on the received thread-ID signal signifying the low or high priority nature of the request from a hardware thread 11. The selected signal 504 is then applied via the AND-gate 510 to the bits of the decision signal 241 of the RPA 240, resulting in the RPA 240 to point to only a subset of the cache ways 251.

The resulting signal 511 is then outputted from the cache way selection logic subsystem 202 to multiplexer 520 which then selects from either the original selection of the cache ways 251 by the RPA 240, as signified by signal 241, or the biased selection of the cache ways 251 by applying one of the selected high priority thread or low priority thread masks 230 or 220, as signified by signal 511. The selection is made based on the received enable (EN) signal 521 indicating whether the high priority thread or low priority thread masks 230 or 220 have been enabled. As described above in conjunction with block 350 of FIG. 3, the decision to disable high priority thread or low priority thread masks 230 or 220 depends on the reassignment determinations as to the assigned high priority hardware thread 11, such as HT_1. Next, the output of the multiplexer 520 is fed into a victim way determination logic block 530 to determine which of the cache ways 251 can be used to host an incoming hardware thread 11. Suitably, the victim way determination logic block 530 may be implemented in a variety of software or hardware implementations. The cache way 251 determinations depends on whether the selection is to be made based on the original selection of the cache ways 251 by the RPA 240 or the biased selection of the cache ways 251 as selected by multiplexer 520 based on the enable signal 521. The output of the victim way determination logic block 530 is then inputted into the multiplexer 540.

The multiplexer 540, in a manner described above in conjunction with decision block 310 in FIG. 3, then selects between a victim way 531 determined via the above process corresponding to blocks 320 to 350 of FIG. 3, or a victim way 273 determined based on whether a cache way 251 does not host a hardware thread 11. The select signal 272 from the state array 270 determines the selection made by multiplexer 540. As described above in conjunction with blocks 310 and 360 of FIG. 3, if a cache way 251 does not host a hardware thread 11, then that cache way 251 is selected and therefore the multiplexer 540 selects input 273 from state array as its output. Otherwise, input 531 is selected. As noted above, the operation of multiplexer 540 maybe performed prior to or at any point subsequent to those of the cache way selection logic subsystem 550, depending on the desired software or hardware implementation considerations.

It should be noted that the various features of the foregoing embodiments were discussed separately for clarity of description only and they can be incorporated in whole or in part into a single embodiment of the invention having all or some of these features.

What is claimed is:

1. A method comprising:
selecting a first subset of a plurality of cache ways to store data of threads identified as being high priority threads;
assigning a high priority thread to a cache way of the first subset of the plurality of cache ways;
assigning a lesser priority thread to a different second subset of the plurality of cache ways that were not selected to store high priority threads; and
reassigning the high priority thread to a different one of the plurality of cache ways if the high priority thread remains in an inactive usage status for at least a threshold amount of time.

2. The method of claim 1, wherein prior to reassigning the high priority thread to a different one of the plurality of cache ways if the high priority thread remains in an inactive usage status, the method further comprises:
determining if at least one cache way in the plurality of cache ways is not to be accessed by a hardware thread.

3. The method of claim 2, wherein reassigning includes disabling a high priority thread mask and a low priority thread mask to eliminate restrictions of assignment of the high priority thread.

4. The method of claim 1, wherein the first subset of cache ways exceeds fifty percent of a number of the plurality of cache ways forming a memory.

5. The method of claim 1, further comprising:
calculating the inactive usage status by comparing measured cache usage of the high priority thread with a cache usage threshold value until the measured cache usage has reached the cache usage threshold.

6. The method of claim 1, wherein the selecting of the first and second subsets decreases the chances of low priority threads from equally sharing the cache subsystem with high priority threads.

7. The method of claim 1, wherein the inactive usage status is calculated by a counter coupled, the counter to increment a count corresponding to at least the threshold amount of time during which the high priority thread maintains the inactive usage status based on measured cycles of a clock.

8. The method of claim 7, wherein reassigning includes disabling a low priority thread mask and a high priority thread mask by changing their respective enable bits, the high priority thread mask altering selections of a replacement policy array such that a subset of the plurality of cache ways is set aside to be used for high priority threads, each of the low and high priority thread masks includes registers to hold a plurality of bits to generate a signal being applied to a decision signal of the replacement policy array to facilitate the replacement policy array to select the first and second subsets.

9. The method of claim 1, wherein the first subset is less than the second subset.

10. A processor comprising:
a first logic to select a first subset of a plurality of cache ways to store data of threads identified as being high priority;
a hardware thread assignment subsystem to assign a high priority thread to the first subset of the plurality of cache ways; and a second logic to reassign the high priority thread to one of the plurality of cache ways if the high priority thread remains in an inactive usage status for at least a threshold amount of time.

11. The processor of claim 10, wherein the second logic is further to determine if at least one cache way in the plurality of cache ways is not to be accessed by a hardware thread.

12. The processor of claim 10, wherein the second logic is further to disable the high priority thread mask and the low priority thread mask to eliminate restrictions of assignment of the high priority thread.

13. The processor of claim 10, wherein the first subset of cache ways exceeds fifty percent of a number of the plurality of cache ways forming a memory.

14. The processor of claim 10, wherein calculating the inactive usage status includes comparing measured cache usage of the high priority thread with a cache usage threshold value until the measured cache usage has reached the cache usage threshold.

15. The processor of claim 10, wherein the selecting of the first and second subsets decreases the chances of low priority threads from equally sharing the cache subsystem with high priority threads.

16. A computer system comprising:
a memory to store a multi-threaded program;
a processor core to perform the multi-threaded program; and
a cache memory coupled to the processor core, wherein the cache memory includes a plurality of cache ways, a first subset of the plurality of cache ways being accessed by a high priority thread, wherein the high priority thread is reassigned to one of the plurality of cache ways if the high priority thread remains in an inactive state for at least a threshold amount of time.

17. The computer system claim 16, wherein the first subset is selected based on a first predetermined mask comprising at least one first mask register.

18. The computer system of claim 16, wherein the first subset of cache ways exceeds fifty percent of a number of the plurality of cache ways forming a memory.

19. The computer system of claim 16, wherein calculating the inactive usage status includes comparing measured cache usage of the high priority thread with a cache usage threshold value until the measured cache usage has reached the cache usage threshold.

20. The computer system of claim 16, wherein the selecting of the first and second subsets decreases the chances of low priority threads from equally sharing the cache subsystem with high priority threads.

21. An apparatus comprising:
a processor core;
a memory cache having a replacement policy array coupled to the processor core;
a thread assignment mechanism coupled to the memory cache and processor core; and
a cache usage monitoring system having a thread activity logic having a counter, wherein the memory cache includes a plurality of cache ways, and wherein a first subset of the plurality of cache ways is to be accessed by a high priority thread, the thread assignment mechanism to assign a lesser priority thread to a second subset of the plurality of cache ways, and the thread assignment mechanism is further to reassign the high priority thread to one of the plurality of cache ways if the high priority thread remains in an inactive usage status for at least a threshold amount of time.

22. The apparatus of claim 21, wherein the thread assignment mechanism is further to disable the high priority thread mask and the low priority thread mask to eliminate restrictions of assignment of the high priority thread.

23. The apparatus of claim 21, wherein the first subset of cache ways exceeds fifty percent of a number of the plurality of cache ways forming a memory.

24. The apparatus of claim 21, wherein calculating the inactive usage status includes comparing measured cache usage of the high priority thread with a cache usage threshold value until the measured cache usage has reached the cache usage threshold.

25. The apparatus of claim 21, wherein the selecting of the first and second subsets decreases the chances of low priority threads from equally sharing the cache subsystem with high priority threads.

26. The apparatus of claim 21, wherein reassigning includes disabling a low priority thread mask and a high priority thread mask by changing their respective enable bits, the high priority thread mask altering selections of a replacement policy array such that a subset of the plurality of cache ways is set aside to be used for high priority threads, each of the low and high priority thread masks includes registers to hold a plurality of bits to generate a signal being applied to a decision signal of the replacement policy array to facilitate the replacement policy array to select the first and second subsets and the counter to calculate the inactive usage status by incrementing a count based on measured cycles of a clock, the count corresponding to at least the threshold amount of time during which the high priority thread maintains the inactive usage status.

27. An apparatus comprising:
a processor core;
a memory cache coupled to the processor core, the memory cache including a plurality of ways including a first subset to be accessed by a high priority thread;
a thread assignment mechanism, the thread assignment mechanism to assign a lesser priority thread to a second, different subset of the plurality of cache ways and reassign the high priority thread to one of the plurality of cache ways not in the first subset if the high priority thread remains in an inactive usage status for at least a threshold amount of time.

28. The apparatus of claim 27, wherein the thread assignment mechanism to calculate the inactive usage status by comparing measured cache usage of the high priority thread with a cache usage threshold value until the measured cache usage has reached the cache usage threshold.

29. The apparatus of claim 27, wherein the selecting of the first and second subsets decreases the chances of low priority threads from equally sharing the cache subsystem with high priority threads.

30. The apparatus of claim 27, further comprising a high priority thread mask altering selections of the replacement policy array such that a subset of the plurality of cache ways is set aside to be used for high priority threads.

31. The apparatus of claim 27, wherein the thread assignment mechanism is further to disable the high priority thread mask and the low priority thread mask to eliminate restrictions from assignment of the high priority thread.

32. The apparatus of claim 27, wherein the first subset of cache ways exceeds fifty percent of a number of the plurality of cache ways forming a memory.

* * * * *